Feb. 16, 1971
F. J. ZAVASNIK
3,563,975
RECOVERY OF POLYMER POWDERS FROM PRESSURIZED
SOLUTIONS OF POLYMER
Filed June 12, 1969
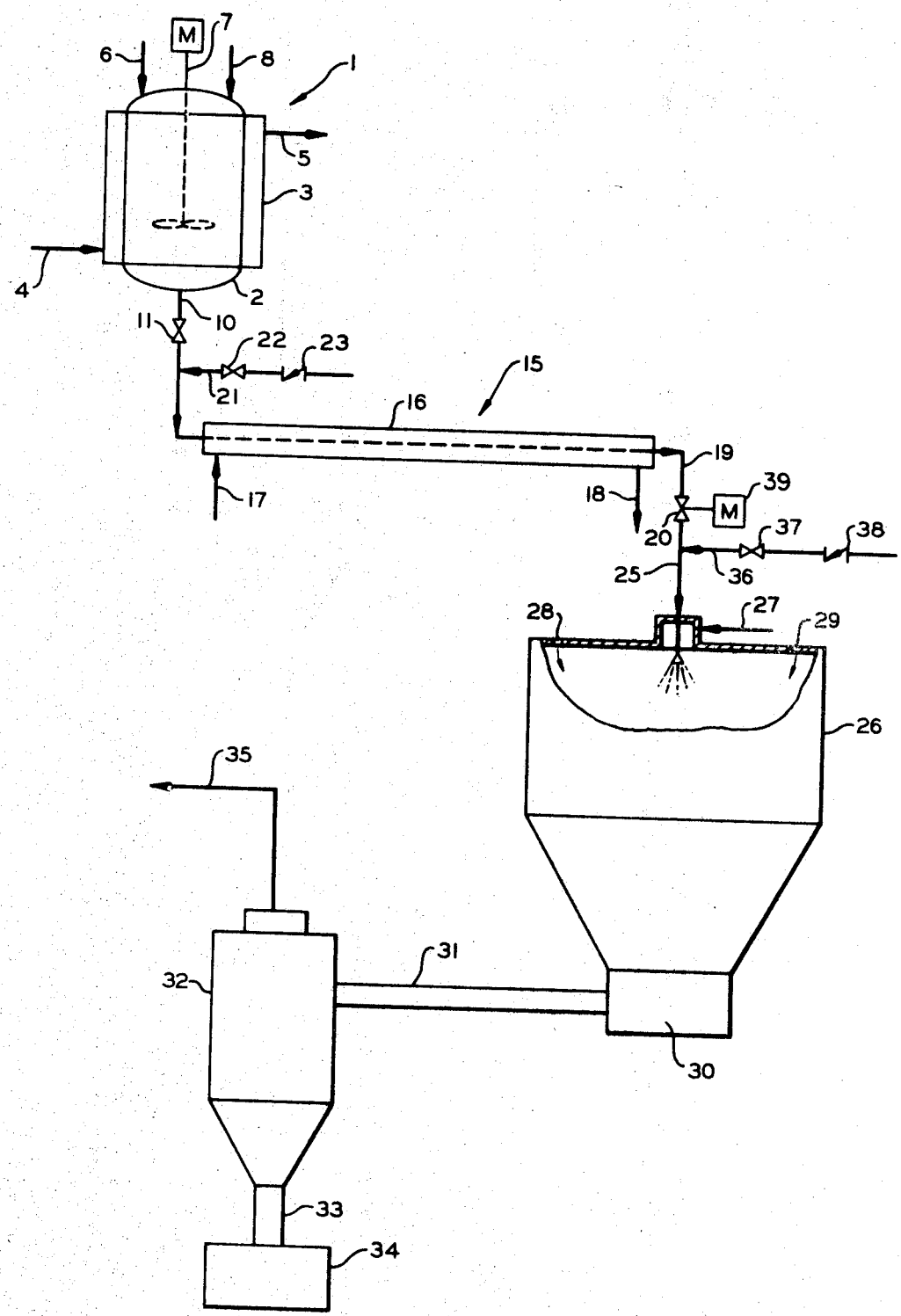
INVENTOR
F. J. ZAVASNIK
BY
Young & Quigg
ATTORNEYS United States Patent Office 3,563,975
Patented Feb. 16, 1971

3,563,975
RECOVERY OF POLYMER POWDERS FROM
PRESSURIZED SOLUTIONS OF POLYMER
Fredrick J. Zavasnik, % Phillips Petroleum Co.,
Bartlesville, Okla. 74003
Continuation-in-part of application Ser. No. 482,555,
Aug. 25, 1965. This application June 12, 1969, Ser.
No. 836,206
Int. Cl. C08f 1/88
U.S. Cl. 260—94.9        8 Claims

ABSTRACT OF THE DISCLOSURE

High density polymer powders are directly formed from a hot pressurized solution of a polymer by passing the polymer solution to an elongated cooling means thereby indirectly cooling the solution to precipitate the polymer while maintaining the solution under sufficient pressure to prevent substantial vaporization of the solvent. The resulting slurry is intermittently removed from the elongated cooling means and introduced into a zone maintained at a pressure sufficiently lower than the pressure of the solution to cause vaporization of the solvent.

This application is a continuation of Ser. No. 482,555, filed Aug. 25, 1965, now abandoned.

This invention relates to a method and apparatus for producing polymer powders. In one aspect, this invention relates to an improved method and apparatus for making polymer powders directly from pressurized solutions of high density polymers in an extraneous solvent.

Heretofore in the formation of powders from polymers which are initially formed in solution in an extraneous solvent, i.e. a solvent different from the monomers employed to make the polymers, the polymer has been precipitated from and separated from the solution after which it was mechanically ground or broken into the desired powder. These types of methods have been followed at least in part because the polymer solution from the reactor is heated and under an elevated pressure and when it is attempted to recover the polymer directly from the solution substantial depressurization of the solution is practiced. This substantial depressurization step created the problem of foaming of the polymer, apparently due to vaporization of the solvent causing the polymer to form into a massive, honeycomb or cellular type material which substantially plugged up any closed container or conduit in which the depressurization step took place. Although not completely understood and therefore not desiring to be bound thereby, it appears that when the polymer solution was depressurized the solvent vaporized and the polymer present was forced into a configuration similar to the internal configuration of the container in which the solution was depressurized and solidified in this configuration by the cooling effect caused by the vaporization of the solvent. Thus, a massive piece of polymer was formed which was permeated with a multiplicity of pores formed by the vaporizing solvent. Since the polymer's honeycomb or foamed form was of a massive, continuous nature which substantially filled any container in which it was present, the container was effectively plugged thereby.

It has now been found that high density polymer powder can be formed directly from a hot, pressurized solution of high density polymer in an extraneous solvent without the formation of massive sections of foamed polymer by cooling the polymer solution to cause precipitation of polymer therefrom while maintaining that solution under a pressure sufficiently elevated to prevent substantial vaporization of solvent after which the cooled solution is intermittently introduced into a heated zone maintained at a pressure sufficiently lower than the pressure on the solution to cause vaporization of the solvent, from which is obtained a fine, dry polymer powder.

The apparatus for producing this polymer powder comprises a heated pressure means for containing the polymer solution which is connected to an intermittent pressure letdown means by a pressurized cooling means which is adapted to cool the polymer solution therein to cause precipitation of polymer from that solution while maintaining sufficient pressure on the solvent to prevent substantial vaporization of solvent. The solvent slurry from the pressurized cooling means passes through the pressure letdown means and into a heated vaporization means which is maintained at a pressure sufficiently lower than the cooling means to cause vaporization of solvent. Conventional means is then employed for separating the powder formed in the vaporization means from the vaporized solvent.

Accordingly, it is an object of this invention to provide a new and improved method and apparatus for producing polymer powder. It is another object of this invention to provide a new and improved method for producing polymer powders directly from pressurized solutions of high density polymers in an extraneous solvent.

Other aspects, objects and the several advantages of this invention will be readily apparent to those skilled in the art from the description, the drawing, and the appended claims.

In the drawing there is shown a system embodying this invention.

In the drawing there is shown a heated pressure means 1 used as a source of polymer solution for the method of this invention. This source comprises a container 2 having a heated jacket 3 thereabout through which a heated fluid is circulated by means of conduits 4 and 5. The polymer solution to be treated is passed into container 2, preferably from the polymerization reactor, through conduit 6 and stirred therein by stirrer 7. An inert gas such as nitrogen is passed into container 2 through conduit 8 to maintain an elevated pressure in container 2 which is substantially the same as that pressure employed in the polymerization reactor. Instead of container 2 a polymerization reactor can be used which is pressurized in a conventional manner such as by the monomer and/or solvent employed in the polymerization reaction.

Generally, the temperature of the polymer solution in container 2 is maintained at from about 200 to about 400° F. and a pressure of from about 350 to about 550 p.s.i.g. Polymer solution passes out of container 2 through conduit 10 and valve 11, which can be a check valve if desired, into a pressurized cooling means generally shown as 15. Cooling means 15 can be a jacketed ½ to 2 inch diameter pipe from 10 to 60 or more feet long which has cooling liquid such as water passing through its jacket 16 by means of conduits 17 and 18. Cooling means 15 discharges through conduit 19 into intermittent pressure letdown valve means 20.

Cooling means 15 employs a quantity of cooling fluid at a temperature such that the polymer solution passing throgh that cooling means is cooled at least to the temperature at which precipitation of polymer from the solution starts, i.e. a temperature at which polymer is no longer readily soluble in the extraneous solvent. Although this temperature can vary depending upon the polymer, the solution, the concentration of polymer in the solvent, and the like it will generally be in the range of from about 190 to about 230° F. The pressure in cooling means 15 will be maintained sufficiently elevated so that substantial vaporization of the solvent in cooling means 15 is prevented but lower than the pressure in container 2 so that the pressure in that container is the motivating force for movement of material through cooling means 15. This pressure can vary widely but generally will be from about 200 to about 300 p.s.i.g. The pressure in cooling means 15 is originally achieved by the introduction of an inert gas such as nitrogen or a solvent for the polymer or both into conduit 10 by conduit 21 after which the polymer solution source 2 maintains that pressure. The amount of fluid introduced through conduit 21 is controlled by valve 22 and check valve 23 is employed to prevent passage of polymer solution through line 21 to the source of the pressurizing fluid.

Intermittent pressure letdown means 20 can be a conventional metering device in which a fixed amount of material is allowed to periodically pass therethrough. Such a metering device is fully and completely disclosed in U.S. Pat. 3,167,398 which device employs the captive ball concept wherein a chamber is provided having inlet and outlet orifices at opposite ends thereof and through which the polymer slurry from 19 must pass in order to reach conduit 25 and ultimately heated vaporization means 26. A moveable ball is employed in this chamber so that when an amount of polymer slurry is being discharged from that chamber the ball moves in the direction of the slurry leaving the chamber and when it reaches the end of the chamber plugs the outlet orifice and stops the flow of polymer slurry from the chamber. While the ball is moving toward the outlet orifice additional polymer slurry is entering the inlet orifice so that when the chamber is reversed in direction so that the prior outlet orifice takes the place of the prior inlet orifice, the prior inlet orifice becomes the outlet orifice and polymer slurry passes therefrom into conduit 25 with the subsequent movement of the captive ball toward this new outlet orifice. Thus, an additional amount of polymer slurry is thereby introduced into conduit 25.

Motor 39 is employed to continuously rotate the chamber of the metering device so that intermittent increments of polymer slurry are continuously removed from conduit 19 and passed into conduit 25. The rate of rotation of the chamber can vary widely to meet desired conditions that also vary widely, but can generally be from about 10 to about 150 revolutions per minute. If desired, suitable conventional mechanical means can be employed along with motor 27 to rotate the chamber of the metering device in any given cycle which includes pausing and holding of the chamber in a closed position so that for a finite period of time no polymer slurry is passed into conduit 25. Thus, the intermittency of pressure letdown means 20 can be controlled to any desired time cycle.

Pressure letdown means 20 serves to maintain the pressure in cooling means 15 at the desired elevated magnitude. Further, pressure letdown means 20 with its intermittent operation serves to prevent the formation of a velocity gradient through cooling means 15 such as that which would be formed if polymer slurry was continuously passed from conduit 19 to conduit 25. By preventing the formation of velocity gradients along the length of cooling means 15, shear forces across the cross-section of cooling means 15 are prevented from forming and polymer strings which tend to form in the presence of such shear stresses just before the polymer is precipitated are also prevented from forming. Also, by this intermittent pressure letdown aspect, a high velocity movement of material through cooling means 15 is at least intermittently achieved which is desirable since high velocity promotes the best heat transfer. It should be noted that even though high velocity movement is at least intermittently achieved, the material in cooling means 15 is not subjected to substantial turbulence because, due to the intermittency of the pressure letdown, increments of material in cooling means 15 tend to remain in the same general position while moving through cooling means 15 in a successive series of starting and stopping movements caused by the intermittent operation of valve 20.

The intermittent operation of valve 20 not only solves the polymer stringing problem that is present if continuous discharge of slurry from cooling means 15 were practiced, but also solves the problem of having orifices in valve 20 sufficiently large enough to allow the passage of polymer particles therethrough without allowing substantial pressure letdown upstream of valve 20 thereby causing foaming of the polymer upstream and plugging conduit 19 and valve 20. Discharge of polymer slurry through conduit 19 could not be sufficiently obtained using a fixed orifice pressure letdown means such as a needle valve because when the orifice is made small enough to maintain the pressure in cooling means 15, the orifice is too small to satisfactorily pass the polymer particles in the slurry and therefore tends to plug up. On the other hand when the orifice is made large enough to pass the polymer particles, pressure letdown tends to occur upstream in conduit 19 thereby causing foaming of the polymer and plugging of that conduit. Also, the solid polymer particle slurry formed in cooling means 15 tends to segregate into increments containing major amounts of polymer adjacent to increments containing minor amounts of polymer. This segregation factor also creates problems with continuous flow, pressure letdown systems because the orifice of those systems has to be varied in cross-sectional area depending upon whether an increment containing a major amount or a minor amount of polymer is passing therethrough to avoid risking plugging the orifice. This problem is not present by the use of intermittently operating valve 20.

Cooling means 15 and pressure letdown means 20 can be connected directly to a polymerization reactor if that is used as the polymer solution source in lieu of container 2.

The slurry passes from conduit 25 into vaporization zone 26 which is maintained at a pressure sufficiently lower than cooling means 15 to cause vaporization of the solvent. Generally, the pressure in vaporization means 26 is substantially or slightly less than ambient. Air is introduced through conduit 27 around the periphery of the end of conduit 25 that extends into vaporization means 26 so that the slurry is atomized to allow for more efficient evaporation of the solvent. Any conventional atomizing type nozzle can be employed such as a Binks nozzle. The air or other atomizing fluid employed generally will be at an ambient temperature, e.g. from about 60 to about 100° F. Heat is supplied to vaporization means 26 through orifices 28 and 29 through which is drawn air at an ambient temperature substantially the same as that air in conduit 27. The fluid employed in conduit 27 as well as the heating fluid passing through orifices 28 and 29 can be formed of other materials such as inert gases, e.g. nitrogen and the like. The fluids can also be heated above 100° F. if desired but generally this is not needed, ambient temperature being sufficient to effect vaporization of the solvent and drying of the polymer particles.

To insure that conduit 25 is not plugged by solid polymer and to provide a carrier for transporting the slurry to vaporization means 26, a pressure fluid is supplied through conduit 36 which fluid can be the same as that supplied through conduit 21. Valve 37 and check valve 38 serve the same purposes as valves 22 and 23. The fluid can be pulsed or flow continuously from 36 to 25. The temperature of the fluid passing through 36 can be ambient and will be at a pressure intermediate the pressures present in conduit 19 and vaporization means 26. Generally, the pressure will be from about 100 to about 150 p.s.i.g. If the fluid is pulsed from conduit 36 into conduit 25 a pressure higher than the pressure in conduit 19 can be applied if the intermittent actuation of pressure letdown means 20 is not attempted when the pulse fluid pressure in conduit 25 is above the pressure in conduit 19.

The solvent vapor-polymer powder mixture is removed from the bottom of vaporization means 26 by means of blower 30 and passed through conduit 31 into a conventional gas-solids separator 32. Separator 32 can be any conventional apparatus well known in the art such as a Cyclone separator. The dried polymer powders pass from the bottom of separator 32 through conduit 33 into collector 34 for storage, further treatment, or disposition as desired. Solvent vapor, very fine powder, and other vapors are removed from separator 32 through line 35 and can be either vented to the atmosphere or passed through conventional treatment apparatus for the separation and recovery of the polymer powder fines and/or the separation and recovery of the solvent.

The polymers applicable to this invention are homopolymers and copolymers of two or more 1-olefins having no branching nearer the double bond than the 4-position, preferably having from 2 to 8 carbon atoms per molecule, which have a specific gravity of at least 0.94 at 20° C.

Examples of such 1-olefins include ethylene, propylene, 1-butene, 1-pentene, 1-hexene, 1-octene, 4-methyl-1-pentene, 4-methyl-1-hexene, 4-ethyl-1-hexene, 6-methyl-1-heptene, 5-methyl-1-heptene and the like.

The solvents employed in forming the solutions of this invention must not merely be diluents but must be actual solvents for the polymers and are generally hydrocarbons, preferably paraffins and/or cycloparaffins having from 3 to 12 carbon atoms per molecule. Generally, any hydrocarbon which is relatively inert, non-deleterious, liquid under the conditions of operation of the polymerization process, and, more importantly, a solvent for the polymer formed can be utilized.

Examples of such solvents include propane, isobutane, normal pentane, isopentane, isooctane (2,2,4 - trimethylpentane), cyclohexane, methylcyclohexane, and the like. The solutions of this invention will generally contain from less than 1 to about 20, preferably from about 5 to about 12, weight percent polymer based upon the total weight of the solution. Of course, mixtures of the above solvents can be employed.

Generally, any polymerization process which forms high density polymers in solutions of extraneous solvents can be employed. A preferred process is that described in U.S. Pat. 2,825,721 wherein novel polymers of 1-olefins are produced by carrying out the polymerization at the temperature in the range of 100 to 500° F. in the presence of 0.1 to 10 or more weight percent chromium as the oxide including substantial portions of hexavalent chromium, ususally associated with at least one oxide selected from the group consisting of silica, alumina, and fluoria. A preferred catalyst is one comprising 0.1 to 10 weight percent chromium as the oxide on a silica-alumina support such as 90 percent silica—10 percent alumina. This catalyst is ordinarily a high oxide catalyst which has been activated by a high temperature treatment, preferably with an oxidizing gas. The polymerization is carried out in the liquid phase as in solution in a hydrocarbon solvent such as those discussed above.

The powders produced by this invention will be quite fine in that in general a majority of the particles formed will pass through a 140-mesh U.S. Standard screen with the substantial remainder passing through a 200-mesh U.S. Standard screen. These powders when produced using air at ambient temperatures have a volatiles content of from about 0.3 to about 4 weight percent when produced at the rate of 1 or less pounds per hour. Higher production rates can and are readily achieved as and when desired. Specifically, the powders can have at least 70 weight percent passing through 140-mesh screen and 20 weight percent passing through a 200-mesh screen and have a volatile content of from about 0.3 to about 4 weight percent based upon the total weight of the powder. It is not unusual, however, for the powders of this invention to have 95 weight percent or more pass through a 200-mesh screen and have a volatile content of from about 0.3 to 4 weight percent. The powders, due to their small particle size have a bulk density on the order of 6 lb./cubic foot.

The powders of this invention can be employed in rotational casting, in fluidized bed coating, as a lubricant for catalyst preparation, or compressed into pellets, and the like.

EXAMPLE

A solution comprising cyclohexane containing 8 weight percent polyethylene, based upon the total weight of the solution, having a density of 0.96 and a melt index of 0.2 was heated to about 310° F. under a pressure of about 500 p.s.i.g. in container 2.

The solution passed from container 2 into conduit 10, was mixed with cyclohexane pressurized to about 250 p.s.i.g. from conduit 21 and passed into cooling means 15 which was composed of ½-inch diameter copper tubing about 20 feet long, which tubing had a water jacket therearound through which was circulated cooling water at a temperature of about 70° F.

The polymer slurry was passed from cooling means 15 through conduit 19 into a pressure letdown valve having a single chamber and captive ball with an internal structure substantially the same as that disclosed in FIG. 1 of U.S. 3,167,398. The captive ball containing chamber was rotating continuously at sufficient revolutions per minute to cause the passage of about 9 pounds per hour of slurry through conduit 25 into vaporization means 26. Nitrogen passing at a pressure of about 125 p.s.i.g. was pulsed into conduit 25 from conduit 36 at about 60 cycles per minute.

Vaporization means 26 was a cylindrical chamber about 20 inches in diameter and about 76 inches in height which employed air at about 100 p.s.i.g. for the atomizing fluid line 27 and air at about 77° F. as the heating fluid admitted through orifices 28 and 29.

A 350 cubic feet per minute squirrel cage blower was employed at 30 and about 0.7 pound per hour of polyethylene powder having a volatiles content of about 0.34 weight percent based upon the total weight of the polymer was recovered in collector 34. This powder flowed easily with slight agitation. A majority of the powders of this process passed through a 140-mesh U.S. Standard screen and about 20 weight percent of the particles of this powder passed through a 200 mesh U.S. Standard screen.

Reasonable variations and modifications are possible within the scope of this disclosure without departing from the spirit and scope thereof.

I claim:

1. A continuous method for producing polymer powder from a solution composed of at least one high-density olefin polymer dissolved in a solvent comprising providing and maintaining a source of heated polymer solution under a pressure sufficiently elevated to prevent substantial vaporization of said solvent in said source and when said solution is ultimately cooled to cause precipitation of said polymer therefrom, indirectly cooling a portion of said solution by passing said polymer solution through an elongated cooling means to cause precipitation of said polymer therefrom while maintaining an elevated pressure thereon sufficient to prevent substantial solvent vaporization, intermittently removing at a rate of about 10 to 150 times per minute the polymer slurry thus formed from said elongated cooling means and introducing the cooled portions of the polymer slurry into a zone maintained at a pressure sufficiently lower than said source of solution to cause vaporization of said solvent, and recovering polymer powder as a product of the method.

2. The method of claim 1 wherein at least one high-density olefin polymer is selected from the group consisting of homopolymers and copolymers of 1-olefins having a specific gravity of at least 0.94 at 20° C. and from about two to eight carbon atoms per molecule.

3. The process of claim 1 wherein said introducing comprises spraying through an atomizing nozzle and wherein said zone maintained at a pressure sufficiently lower than said source of solution is a heated zone.

4. The method according to claim 1 wherein said polyolefins have a specific gravity of at least 0.94 at 20° C.

and are formed from 1-olefins having from 2 to 8 carbon atoms per molecule and no branching near the double bond than the 4-position, and said solvent is a hydrocarbon which is relatively inert, non-deleterious, liquid under the operating conditions of the polymerization process and a solvent for the polyolefins.

5. The method according to claim 4 wherein said solution contains from less than 1 to about 20 weight percent of polymer based upon the total weight of the solution.

6. The method according to claim 1 wherein said solvent is at least one selected from the group consisting of paraffins and cycloparaffins having from 3 to 12 carbon atoms per molecule in amounts of from about 5 to about 12 weight percent based upon the total weight of the solution; wherein said source of heated polymer solution is under a pressure of at least about 300 p.s.i.g.; wherein said maintaining an elevated pressure thereon of said elongated cooling means is at least 200 p.s.i.g.; and wherein said indirectly cooling is to a temperature below about 230° F.

7. The method according to claim 6 wherein said solvent is cyclohexane.

8. The method according to claim 3 wherein said introducing comprises spraying through said nozzle at a pressure greater than the said elevated pressure on said cooled polymer slurry.

References Cited

UNITED STATES PATENTS

| | | | |
|---|---|---|---|
| 2,949,447 | 8/1960 | Hawkins et al. | 260—93.7 |
| 2,964,516 | 12/1960 | Henderson. | |
| 2,977,351 | 3/1961 | Wiley | 260—94.9 |
| 3,336,281 | 8/1967 | Eilbracht et al. | 260—94.9 |
| 3,341,622 | 9/1967 | Leibson et al. | 260—878 |

JOSEPH L. SCHOFER, Primary Examiner

S. M. LEVIN, Assistant Examiner

U.S. Cl. X.R.

260—80.78, 88.2, 93.7

UNITED STATES PATENT OFFICE

CERTIFICATE OF CORRECTION

Patent No. 3,563,975      Fredrick J. Zavasnik      Dated: February 1

It is certified that error appears in the above-identified patent and 1
Letters Patent are hereby corrected as shown below:

Column 1, after the title, "c/o" should read --- assignor to ---;

"continuation-in-part" should read --- continuati

Signed and sealed this 14th day of December 1971.

(SEAL)
Attest:

EDWARD M. FLETCHER, JR.      ROBERT GOTTSCHALK
Attesting Officer      Acting Commissioner of Patents